Jan. 26, 1954

A. M. OTJEN 2,667,366

LONGITUDINALLY ADJUSTABLE DRAFT DEVICE

Filed Oct. 2, 1950

INVENTOR.
Albert M. Otjen
BY
ATTORNEY

Patented Jan. 26, 1954

2,667,366

UNITED STATES PATENT OFFICE 2,667,366

LONGITUDINALLY ADJUSTABLE DRAFT DEVICE

Albert M. Otjen, Madison, Nebr.

Application October 2, 1950, Serial No. 187,910

1 Claim. (Cl. 280—482)

My invention relates to a tractor and horse drawn hitch.

An object of my invention is to provide a hitch which can be attached to any type of tractor for drawing purposes, and which also can be extended to be used as a tongue for horse drawn purposes.

A further object of my invention is to provide an arrangement which will allow convenient attachment to a tractor regardless of the position of the tractor, and which will then be firmly secured automatically upon reverse motion of the tractor.

A further object of my invention is to provide an automatic attachment, which can be adjusted to accommodate various drawn equipment and wherein the variations of tongues on this equipment will be readily accommodated.

A further object of my invention is to provide means whereby the automatic locking arrangement can be manipulated remotely from the hitch itself.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1:
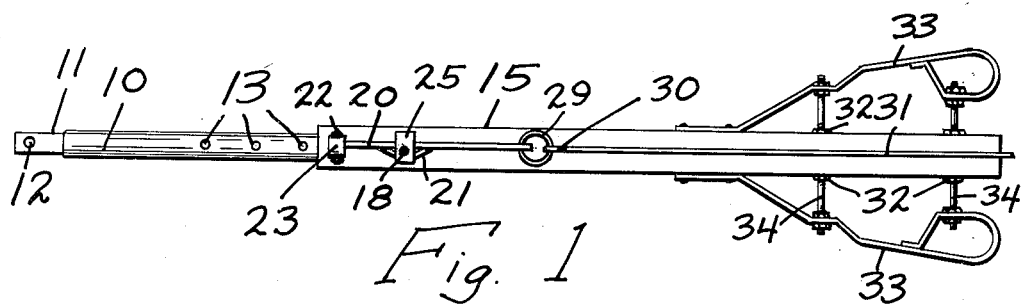
Figure 1 is a plan view of the hitch when being used as a horse drawn device.
Figure 2:
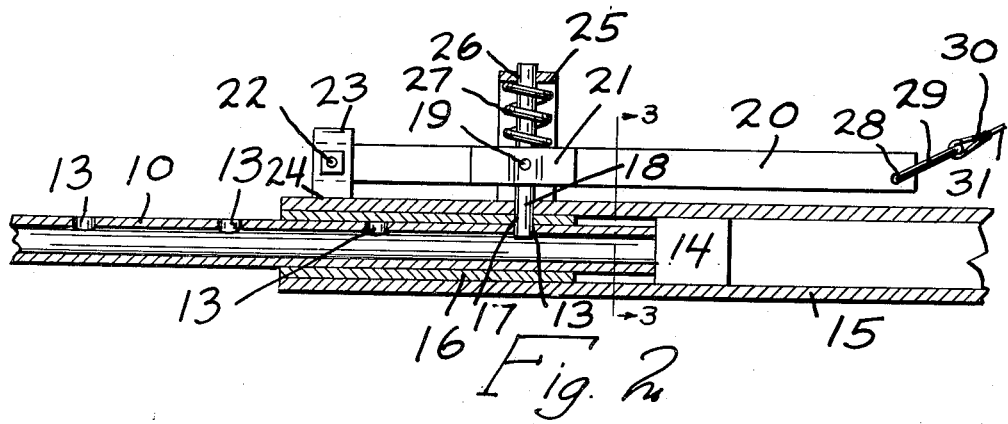
Figure 2 is an enlarged detail.
Figure 3:
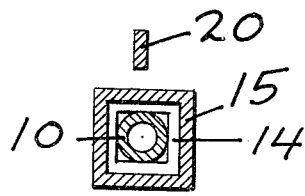
Figure 3 is a sectional view of Figure 2 taken along the lines 3—3 thereof.

I have used the character 10 to designate a circular pipe having the yoke portion 11 for attachment at 12 to a tractor if desired, the pipe 10 having a series of spaced openings 13 therein.

The pipe 10 is rigidly secured to and within a hollow square short tube 14, which short tube 14 is slidably received within the further female square tube 15. Rigidly secured within the tube 15 is a further square tube 16 which is of substantially the same dimensions as the tube 14, the tube 16 having an opening at 17 for the reception of a pin 18, which pin 18 also passes through the member 15, which pin 18 is pivotally attached by means of a transverse pin 19 to a lever member 20, the pin 19 also passing through a further short bar 21 which is attached to the lever 20.

The lever member 20 is pivotally secured at 22 within a keeper 23 which is attached at 24 to the hollow tube 15.

Secured to the member 15 is a further substantially U-shaped keeper member 25 including an opening 26 for the reception of the pin 18, and positioned between the top of the member 25 and the lever 20 and receiving the pin 18 is the compression spring 27. Pivotally secured at 28 to the lever 20 is the circular link 29 to which is attached by means of the snap arrangement 30 a control cable 31 which can pass to the wagon, or if desired, to the tractor.

Attached at 32 to the tube 15 are the various members 33 secured by means of the bolts 34, these members serving to provide means for attachment to the various tongue portions of a wagon. The arrangement can thus be used to draw a wagon by means of a tractor draw-bar by attachment at the point 12 as explained, or if desired the necessary attachments can also be made at 12 whereby these attachments can be attached to horses for drawing the wagon. By virtue of the length of the members 10 and 15, the arrangement can then be accommodated to the horses readily, and as explained above, if desired, the wagon can be tractor drawn.

It will be noted that in either use, the hitch need not be positioned accurately with respect to the drawn vehicle, since the spring 27 will cause the pin 18 to snap into the opening upon movement of the tractor or horses, thereby providing a convenient locking arrangement.

The member 15 and pipe 10 can not become displaced with respect to each other due to the locking feature of the member 14 abutting against the member 16.

Also, the arrangement can be used at any extended position by accommodating the hitch to any of the openings 13, so that therefore the unit can be adjusted longitudinally to be accommodated to any type of equipment where such adjustment is necessary, such equipment being, for instance, corn pickers or the like.

As stated above, the cable 31 can then be used to lift the lever 20 to provide a ready control where desired.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

An adjustable tractor and horse drawn hitch comprising a female tube section, a male tube section slidably engaged with said female section, said male tube section having a plurality of openings therein, a pin passing through said female tube section for engagement with any of said openings, a lengthened horizontal lever member pivotally attached to said pin, said lever member being pivoted to the forward end of said female tube section, a keeper straddling said pin and receiving the same, a spring positioned between the top of said keeper and said lever member for forcing said pin downwardly, a cable attached at the rear termination of said lever member for controlling the lever member, said female tube including an abutment member rigidly attached therein, a further abutment member attached to the termination of said male tube, said abutment members preventing separation of said male and female members.

ALBERT M. OTJEN.

References Cited in the file of this patent

UNITED STATES PATENTS

| Number | Name | Date |
| --- | --- | --- |
| 1,066,735 | Kime | July 8, 1913 |
| 1,068,334 | Goodhue | July 22, 1913 |
| 2,327,308 | Johnston | Aug. 17, 1943 |
| 2,366,294 | Stringer | Jan. 2, 1945 |
| 2,404,521 | Myers | July 23, 1946 |
| 2,428,226 | Jones | Sept. 30, 1947 |
| 2,457,745 | Suess | Dec. 28, 1948 |
| 2,523,591 | Potter | Sept. 26, 1950 |